Figure 1:
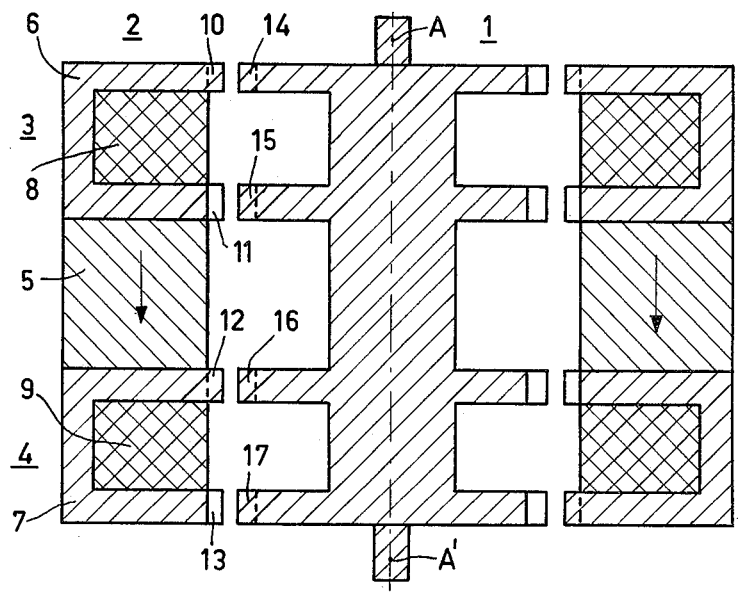

United States Patent [19]

Goddijn

[11] 4,330,724
[45] May 18, 1982

[54] STEPPING MOTOR
[75] Inventor: Bernardus H. A. Goddijn, Eindhoven, Netherlands
[73] Assignee: U.S. Philips Corporation, New York, N.Y.
[21] Appl. No.: 152,078
[22] Filed: May 21, 1980
[30] Foreign Application Priority Data
Jun. 20, 1979 [NL] Netherlands ............ 7904818
[51] Int. Cl.³ ........................... H02K 37/00
[52] U.S. Cl. ...................... 310/49 R; 310/112
[58] Field of Search .............. 310/49, 112, 165; 318/696

[56] References Cited
U.S. PATENT DOCUMENTS
4,206,374 6/1980 Goddijn ............ 310/49 R Primary Examiner—J. D. Miller
Assistant Examiner—D. L. Rebsch
Attorney, Agent, or Firm—Robert S. Smith

[57] ABSTRACT

A stepping motor with a first and a coaxially disposed second stator section. The stator sections are axially separated by a coaxially disposed permanent-magnetic ring. On the inside, each stator section terminates in two coaxially disposed annular systems of teeth. The systems of teeth of each stator section have been shifted nominally by ½ tooth pitch relative to the rotor teeth and the systems situated on the outside relative to the permanent magnetic ring as well as the systems of teeth situated on the inside relative to the permanent magnetic ring exhibit a nominal mutual shift relative to the rotor teeth of ¼ tooth pitch. Stepping angle errors in this stepping motor can now be eliminated to a high degree by symmetrically correcting the displacement of the outer systems of teeth relative to each other and/or the displacement of the inner systems of teeth relative to each other.

4 Claims, 8 Drawing Figures

STEPPING MOTOR

The invention relates to a stepping motor having a stator which at least comprises a first annular stator section with an annular coil and a magnetically conductive enclosure surrounding the annular coil. The enclosure terminates in a first and a second annular system of teeth. A second annular stator section with an annular coil and a magnetically conductive enclosure surrounds the annular coil. The enclosure terminates in a third and a fourth annular system of teeth, and an axially magnetized annular permanent-magnetic member which is situated between the stator sections coaxially with the two stator sections, the second and the third annular system of teeth adjoining said permanent-magnetic member, and a rotor having teeth which cooperate with the first, second, third and fourth systems of teeth. The first system of teeth and the second system of teeth making a nominal electromagnetic angle of 180° with each other relative to the rotor teeth. The third and the fourth system of teeth make a nominal electromagnetic angle of 180° with each other relative to the rotor teeth. The first and the fourth system of teeth make a nominal electromagnetic angle of 90° with each other relative to the rotor teeth, and the second and the third system of teeth make a nominal electromagnetic angle of 90° with each other relative to the rotor teeth.

Such a stepping motor is known from Netherlands Patent Application No. 7701510, which has been laid open to public inspection. Such a motor is especially suitable for realizing very small stepping angles, for example of 1.8°. The Application states that differences in permeance of the paths from the permanentmagnetic ring to the first and the second system of teeth and in those to the third and the fourth system of teeth give rise to asymmetrical torques, i.e. unequal torques in the various energizing phases. It indicates a number of ways to eliminate these inequalities of the said paths.

In practice it is found that equalizing said permeances is very difficult. In addition, it is found that said asymmetrical torques are attended by stepping angle errors, which are far more objectionable than asymmetrical torques.

It is the object of the invention to provide a motor of the type mentioned in the preamble in which stepping-angle errors are largely eliminated.

To this end the invention is characterized in that in order to eliminate stepping-angle errors the angle between the first and the fourth system of teeth relative to the rotor teeth is 90°−α and the said angle between the second and the third system of teeth is 90°+β, α+β being a positive angle of at least 2°, which angular deviations are introduced symmetrically in such a way that said angle between the first and the second system of teeth is substantially equal to the angle between the third and the fourth system of teeth.

In this respect on electromagnetic angle of 360° is to be understood to mean a relative displacement of the rotor with respect to the stator equal to the tooth pitch, i.e. the center-to-center distance of said teeth. For a 1.8° stepping motor, i.e. a stepping motor whose rotor is rotated 1.8° per step and 7.2° per four-step cycle, 360 electromagnetic degrees therefore correspond to 7.2 geometrical degrees.

The invention is based on the recognition that the inequality in permeances gives rise to a detent torque, i.e. the torque in the non-energized condition, which together with the torque determined by the energization gives rise to unequal torques in the four different energizing phases and to unequal stepping angles between the stable rotor positions associated with the four energizing phases, and that for eliminating the stepping-angle errors it is not necessary to eliminate said inequality in permeances, but that by varying the relative angles, between the various systems of teeth, it is possible to eliminate the stepping-angle errors. The required corrections α and β can be applied during alignment of the motor during production. A stepping motor which is eminently suitable for accurate corrections to the alignment is described in Patent Application Ser. No. 152,018, which was filed simultaneously with the present Application.

A stepping motor which is especially adapted for a single-phase energization may further be characterized in that both α and β are positive angles of at least 1° and α and β are substantially equal.

A stepping motor which is especially adapted for two-phase energizing may further be characterized in that one of the angles α or β is substantially is equal to 0° and the other is at least 2°.

However, it is alternatively possible that one of the angles α or β has a negative value. This step enables the different torques to be equalized in a better manner, whilst maintaining the stepping angle accuracy.

Figure 2:
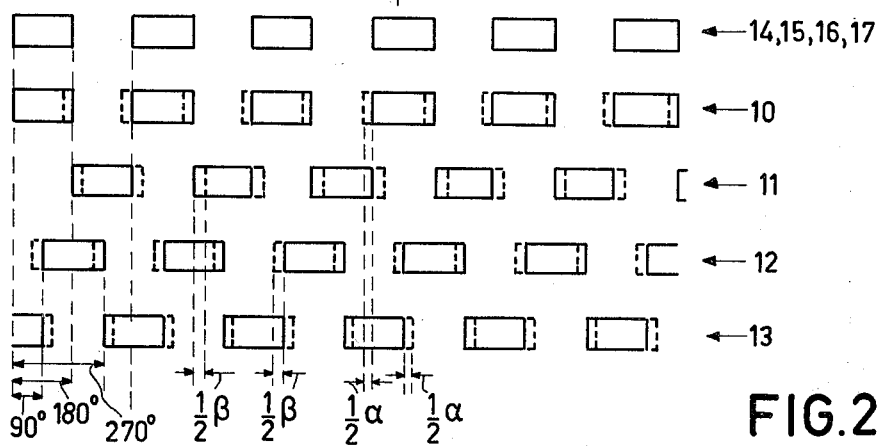
Figure 3:
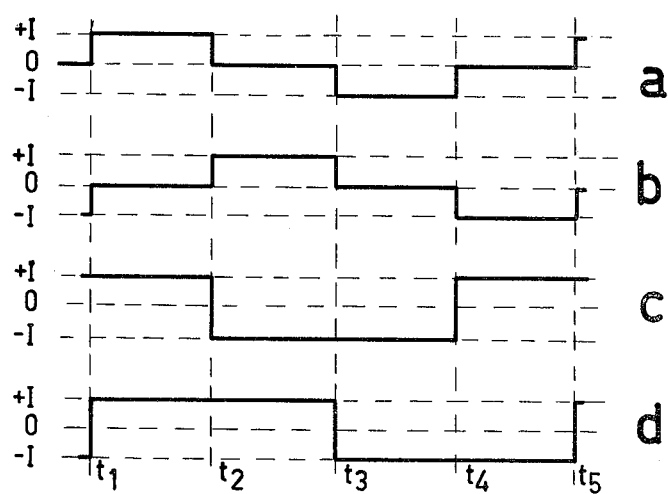
Figure 4:
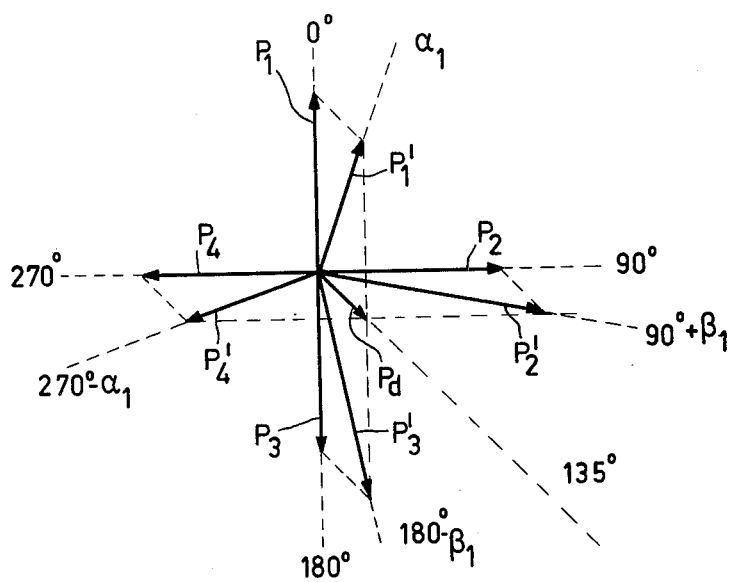
Figure 5:
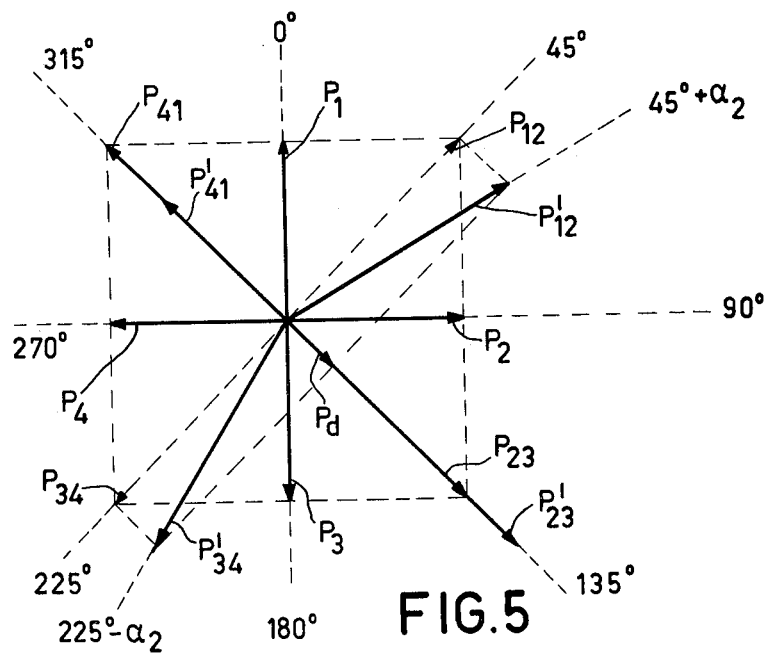
Figure 6:
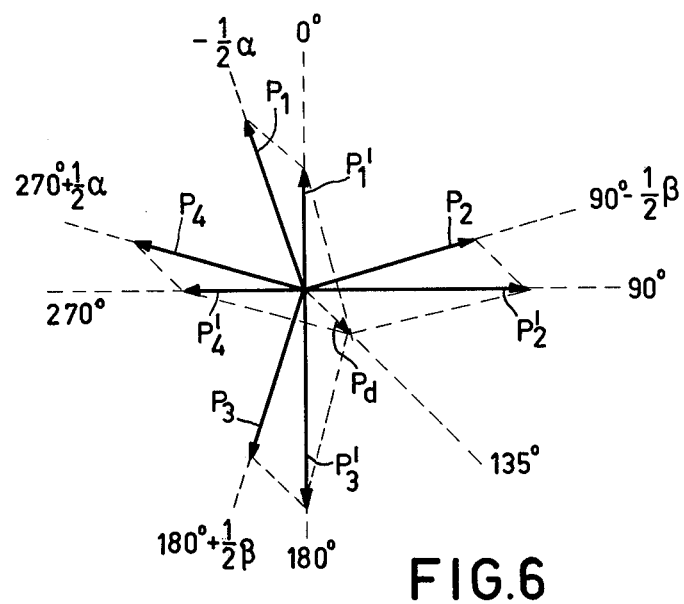
Figure 7:
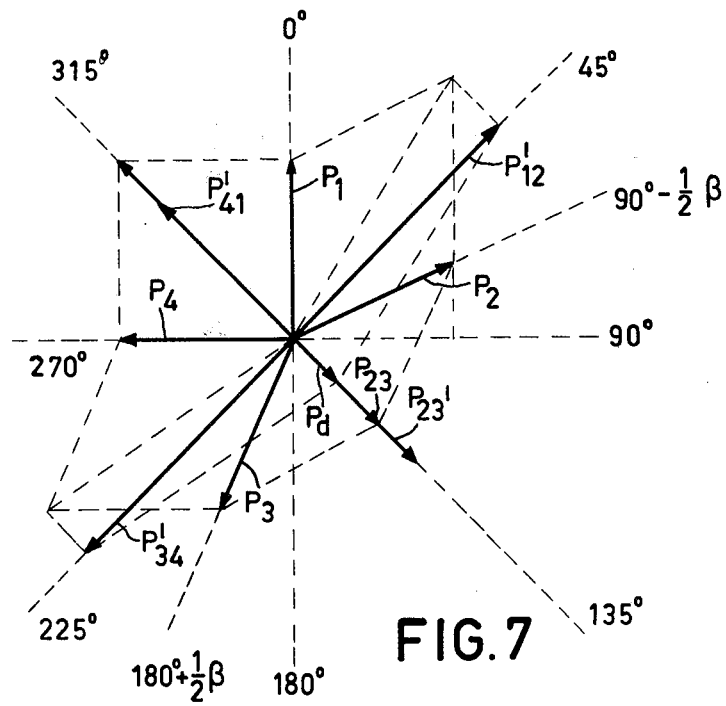
Figure 8:
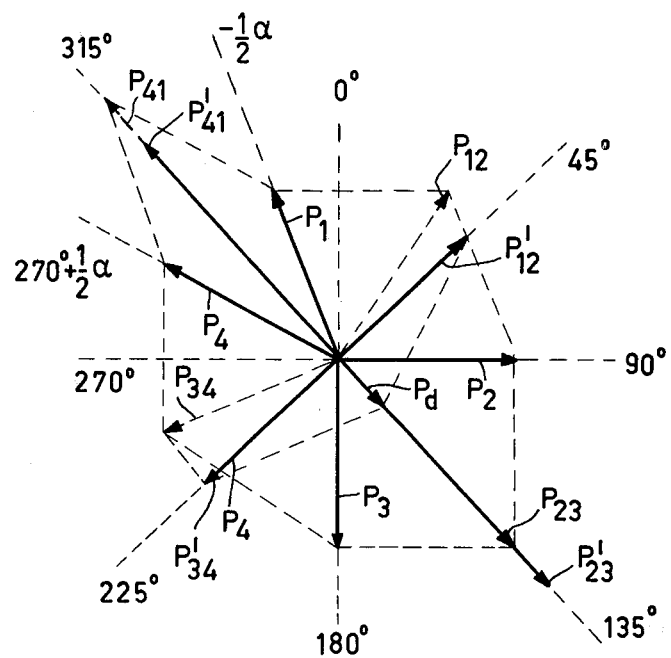

The invention will be described in more detail with reference to the drawing, in which FIG. 1 shows a cross-section of a stepping motor to which the invention can be applied, FIG. 2 schematically represents the relative positions of the stator and rotor teeth, FIG. 3 shows a number of diagrams to illustrate the energization of the motor in accordance with FIG. 1, FIG. 4 is a vector diagram to explain the occurrence of stepping-angle errors in a motor in accordance with FIG. 1 in the case of singlephase energization, FIG. 5 is a similar vector diagram as in FIG. 4 in the case of two-phase energization, FIG. 6 is a vector diagram in accordance with FIG. 4 with corrections in accordance with the invention, FIG. 7 shows a vector diagram in accordance with FIG. 5 with corrections in accordance with the invention, and FIG. 8 shows a vector diagram in accordance with FIG. 4 with an alternative to the correction method of FIG. 7.

FIG. 1 shows an axial cross-section of a stepping motor in which the principle in accordance with the invention can be used. The stepping motor is substantially rotationally symmetrical about the axis A and comprises a rotor 1 and a stator 2. The stator comprises two coaxial stator sections 3 and 4 with coaxially between them an axially magnetized permanent-magnetic ring 5. Each of the stators sections 3 and 4 comprises a coaxially disposed annular coil 8 and 9 respectively surrounded by a magnetically conductive enclosure 6 and 7 respectively, which on the inner side terminates in two annular systems of teeth 10, 11 and 12, 13 respectively. The rotor 1 is provided with annular systems of teeth 14, 15, 16 and 17 which respectively cooperate with the annular systems of teeth 10, 11, 12 and 13.

FIG. 2 schematically represents the arrangement of the stator teeth systems 10, 11, 12 and 13 relative to the rotor teeth systems 14, 15, 16 and 17 respectively. The rotor teeth are axially aligned, so that the upper row in FIG. 2 represents the system of teeth 14, 15, 16 and 17

(the other way round, namely axially aligned stator teeth and shifted rotor teeth is also possible). For a specific position of the rotor the teeth of the stator teeth system 10 are located opposite the rotor teeth (as shown in FIG. 2). The teeth of the stator teeth system 11 should then be shifted substantially 180° or ½ tooth pitch relative to the teeth of the stator teeth system 10. The teeth of the system of teeth 12 are shifted 90° or ¼ tooth pitch (or ¾ tooth pitch viewed in the other direction) relative to those of the system of teeth 10 and the teeth of the system of teeth 13 are shifted 270° or ¾ tooth pitch (or ¼ tooth pitch viewed in the other direction relative to those of the system of teeth 10. The relative positions of the teeth of the systems of teeth 12 and 13 may also be exactly the other way round.

FIG. 3 shows two possiblities of energizing the motor of FIG. 1. In this Figure the diagrams a and b respectively represent the energizing currents for the coils 8 and 9 in the case of single-phase energization (only one coil energized at a time) and the diagrams c and d respectively show the currents in the case of two-phase energization. A current +I is then directed so that the field produced in the air gap between the systems of teeth 12 and 13 by coil 9 has the same direction as the field produced in said air gap by the permanent-magnetic ring 5.

If at the instant $t_1$ a current +I is applied to coil 8 and coil 9 remains energized, the field in the air gap between the systems of teeth 10 and 14 produces a torque which directs the rotor teeth towards the teeth of the system of teeth 10 and, provided that the rotor can move, the situation shown in FIG. 2 is then obtained. If at instant $t_2$ coil 9 is energized with a current +I, while the coil 8 is unenergized, the field in the air gap between the systems of teeth 12 and 16 produces a torque which tends to position the teeth of the system of teeth 12 across those of the system of teeth 16 and the rotor is moved by ¼ tooth pitch. When coil 8 is subsequently energized with a current −I at instant $t_3$, the teeth of the system of teeth 11 are directed towards those of the system of teeth 15 and energizing coil 9 with a current −I at instant $t_4$ causes the teeth of the system of teeth 17 to be directed towards those of the system of teeth 13. Thus, the rotor consecutively moves from the position shown in FIG. 2 at 0° to 90°, 180°, 270° and 360° in steps of 90°.

In the case of the two-phase energization represented in FIGS. 3c and 3d torques are exerted on the rotor in each time two pairs of systems of teeth. For example, when at instant $t_1$ the coils 8 and 9 are each energized with a current +I, the fields in the air gaps between the systems of teeth 10 and 14 and the systems of teeth 12 and 16 produce torques which result in a displacement of the rotor to a position which is situated at 45° from the position shown in FIG. 2. By consecutively energizing the coils 8 and 9 in a manner as illustrated in FIGS. 3c and 3d the rotor consecutively moves to positions at 45°, 135°, 225° and 315° in steps of 90°.

FIG. 4 shows a vector diagram in which the directions of the vectors indicate the position to which the rotor is driven for a specific stator energization and the length of said vector is a measure of the magnitude of the driving torque. By vector addition of the vectors associated with a specific energization, the vector corresponding to the sum of said energizations is obtained. The vectors $P_1$, $P_2$, $P_3$ and $P_4$ respectively correspond to single-phase energization of coil 8 with a current +I, coil 9 with a current +I, coil 8 with a current −I, and coil 9 with a current −I. The magnitudes of the associated torques are equal in the case of an ideal motor.

In practice the permeances of the paths from the permanent magnetic ring 5 to the systems of teeth 10, 11, 12 and 13 will not be equal, the rotor will exhibit a preferred position when the motor is unenergized, which position, because the permeances to the systems of teeth 11 and 12 will be smaller than those to the systems of teeth 10 and 13 and because the stator is symmetrical relative to the permanent magnetic ring 5, will be situated at approximately 135°. The vector which symbolizes this position and the magnitude of the associated detent torque is designated $P_d$ in FIG. 4.

When the motor is energized the vectors corresponding to this energization are found by vectorially adding the associated vector $P_1$, $P_2$, $P_3$ or $P_4$ to the vector $P_d$. In this respect it is to be noted that theoretically this is not entirely correct, inter alia because the actual torque does not completely correspond to the sum of the ideal torque and the detent torque in the unenergized condition. In the energized condition it may also be assumed that a vector $P_d$ with the same direction as the detent torque exists but with a different length, inter alia owing to saturations which occur as a result of the energization which torque $P_d$, which then need not have the same length for all energizing conditions, together with the "ideal" torque yields the actual torque. However, it is found that if the motor does not deviate excessively from an ideal motor this method of representation is a very good approximation of the actual situation.

In FIG. 4 the vectors $P_1'$, $P_2'$, $P_3'$ and $P_4'$ respectively represent the sum of the vector $P_1$, $P_2$, $P_3$ or $P_4$ and the vector $P_d$. As a result of the presence of the torque $P_d$ the rotor positions for the various single-phase energizations thus deviate from the ideal positions and the stepping angles are not equal to each other. The actual rotor positions for the various single-phase energizations are the positions $\alpha_1$, $90°+\beta_1$, $180°-\beta_1$ and $270°-\alpha_1$, so that these stepping-angle errors are $\beta_1-\alpha_1$, $2\beta_1$ and $2\beta_1$. The torques are then no longer equal to each other, but this is substantially less annoying than the occurrence of stepping-angle errors.

FIG. 5 shows the same vector diagram as FIG. 4 for the two-phase energization discussed with reference to FIGS. 3c and 3d. In said Figure the vectors $P_{12}$, $P_{23}$, $P_{34}$ and $P_{41}$ represent the torques which would occur in an ideal motor in the case of two-phase energization and which are produced by the combination of the vectors $P_1$ and $P_2$, $P_2$ and $P_3$, $P_3$ and $P_4$ and $P_4$ and $P_1$ respectively. The vectors $P_{12}$, $P_{23}$, $P_{34}$ and $P_{41}$ represent the actual torques, which vectors are obtained by vectorial addition of the vectors $P_{12}$, $P_{23}$, $P_{34}$ and $P_{41}$ respectively and the vector $P_d$. The rotor positions corresponding to the vectors $P_{41}$ and $P_{23}$ are then found to be unmodified relative to the positions of the vectors $P_{41}$ and $P_{23}$, whilst the rotor positions corresponding to the vectors $P_{12}$ and $P_{34}$ exhibit an error $\alpha_2$ in respect of the angle. Again the torques are no longer equal to each other in magnitude.

In accordance with the invention the said stepping-angle errors can be eliminated by introducing a deviation of the angles between the teeth systems from the nominal angles 0°, 90°, 180° and 270°. FIG. 6 shows a vector diagram associated with a motor in accordance with FIG. 1, which has been compensated for single-phase energization. Here the first system of teeth is given a deviation $-\frac{1}{2}\alpha$, the second system of teeth a deviation $-\frac{1}{2}\beta$ the third system of teeth a deviation $+\frac{1}{2}\beta$ and the fourth system of teeth a deviation $+\frac{1}{2}\alpha$. In FIG. 2 these deviations are represented by dashed lines. Thus the angle between the systems of teeth 11 and 12 has been increased symmetrically by $\beta$ relative to 90° and that between the systems of teeth 10 and 13 has been reduced by $\alpha$.

As shown in FIG. 6 the positions of the vectors $P_1$, $P_2$, $P_3$ and $P_4$, which vectors represent the torques in a motor which is ideal when ignoring the relative positions of the systems of teeth 10, 11, 12 and 13, are $-\frac{1}{2}\alpha$, $90°-\frac{1}{2}\beta$, $180°+\frac{1}{2}\beta$ which $270°+\frac{1}{2}\alpha$. Combining these vectors with the vector $P_d$ - which as a result of the corrections may change in respect of magnitude - yields the vectors $P_1'$, $P_2'$, $P_3'$ and $P_4'$ respectively. It is evident that for correct choice of the angles $\alpha$ and $\beta$ the positions of said vectors $P_1'$, $P_2'$, $P_3'$ and $P_4'$ are 0°, 90°, 180° and 270° respectively, so that stepping-angle errors have thus been eliminated. For small deviations the approximation then obtains that the corrections $\alpha$ and $\beta$ to be introduced for compensation are equal to the stepping-angle errors $2\alpha_1$ and $2\beta_1$ in the noncorrected motor (FIG. 4).

The vector diagram of FIG. 5 shows that in the case of two-phase energization the positions of the vectors $P_{23'}$ and $P_{41'}$ exhibit no error, whereas the positions of the vectors $P_{12}'$ and $P_{34}'$ do exhibit an error. For two-phase energization the motor cannot be compensated for by symmetrically changing the angle between only two systems of teeth. FIG. 7 illustrates this for a motor in which the angle between the systems of teeth 11 and 12 has been increased by $\beta$, so that the positions of the vectors $P_2$ and $P_3$ are situated at $90°-\frac{1}{2}\beta$ and $180°+\frac{1}{2}\beta$ respectively. Combing the vectors $P_1$ and $P_2$ with the vector $P_d$ and the vectors $P_3$ and $P_4$ with the vector $P_d$ yields the vectors $P_{12}'$ and $P_{34}'$, which exhibit a correct position equal to 45° and 225° respectively for a suitably chosen angle $\beta$. By way of approximation it is also correct to assume that the required correction $\beta$ is equal to the stepping angle error $2\beta$. In FIG. 7 the vectors $P_{23}'$ and $P_{41}'$ have retained the correct positions at 135° and 315° respectively, although their lengths have changed. The vector $P_{23}'$ for example is shorter than in the case of FIG. 5.

FIG. 8 shows an alternative in the two phase energization case, the angle between the systems of teeth 10 and 14 being reduced by angle $\alpha_1$. In a similar way as in FIG. 7 the vectors $P_{12}'$ and $P_{34}'$ are obtained at correct positions of 45° and 225° respectively by combination when the angle is suitably chosen, the approximation being valid that the correction angle $\alpha$ is equal to the stepping angle error of $2\alpha_2$ (FIG. 5). In the alternative of FIG. 8 the length of vector $P_{23}'$ has increased relative to that of the vector $P_{23}'$ in the situation of FIG. 5. The lengths of the vectors $P_{12}'$ and $P_{34}'$ are then reduced, whereas in the situation of FIG. 7 these lengths have increased. In order to optimize the motor in respect of the magnitude of the torques (corresponding the lengths of the associated vectors) it may be advantageous to combine the corrections $\alpha$ and $\beta$ as shown in the vector diagrams of FIGS. 7 and 8, in which case one of the two corrections may even be negative. In this case the total correction required $\alpha+\beta$ is again approximately equal to the stepping-angle error $2\alpha_2$.

The correction method revealed with reference to the various vector diagrams is also valid when interchanging the positions of the systems of teeth 12 and 13 (270° and 90° instead of 90° and 270° respectively), because the position of the vector $P_d$ then also changes and becomes approximately 225°, which corresponds to inversion of these vector diagrams about the axis 0°–180°.

Instead of applying the corrections to the relative positions of the systems of stator teeth, it is also possible to apply these to the relative positions of the systems of rotor teeth.

The total correction required $\alpha+\beta$ in approximation corresponds to the stepping-angle error in the uncorrected motor. A correction of for example $\alpha+\beta=2°$ is required for a stepping-angle error of approximately $\frac{1}{2}$ % of one tooth pitch (corresponding to 360°).

What is claimed is:

1. A stepping motor having a stator which at least comprises a first annular stator section with an annular coil and a magnetically conductive enclosure surrounding said annular coil, which enclosure terminates in a first and a second annular system of teeth,
   a second annular stator section with an annular coil and a magnetically conductive enclosure surrounding said annular coil, which enclosure terminates in a third and a fourth annular system of teeth, and
   an axially magnetized annular permanent-magnetic member, which is disposed between said stator sections, coaxially with the two stator sections, the second and the third annular system of teeth adjoining said permanent-magnetic member, and
   a rotor having teeth which cooperate with the first, second, third and fourth systems of teeth, the first system of teeth and the second system of teeth making a nominal electromagnetic angle of 180° with each other relative to the rotor teeth, the third and the fourth system of teeth making a nominal electromagnetic angle of 180° with each other relative to the rotor teeth, the first and the fourth system of teeth making a nominal electromagnetic angle of 90° with each other relative to the rotor teeth, and the second and the third system of teeth making a nominal electromagnetic angle of 90° with each other relative to the rotor teeth, characterized in that in order to eliminate stepping angle errors, said angle between the first and fourth system of teeth relative to the rotor teeth is $90°-\alpha$ and the said angle between the second and the third system of teeth is $90°+\beta$, $\alpha+\beta$ being a positive angle of at least 2°, which angular deviations are introduced symmetrically in such a way that said angle between the first and the second system of teeth is substantially equal to said angle between the third and the fourth system of teeth.

2. A stepping motor as claimed in claim 1, charactrized in that both $\alpha$ and $\beta$ are positive angles of at least 1° and that $\alpha$ and $\beta$ are substantially equal.

3. A stepping motor as claimed in claim 1, characterized in that one of the angles $\alpha$ or $\beta$ is substantially 0° and the other is at least 2°.

4. A stepping motor as claimed in claim 1, characterized in that one of the angles $\alpha$ or $\beta$ has a negative value.

* * * * *